United States Patent
Lawton et al.

(10) Patent No.: US 10,380,110 B2
(45) Date of Patent: Aug. 13, 2019

(54) EXPLORE QUERY CACHING

(71) Applicant: salesforce.com, inc., San Francisco, CA (US)

(72) Inventors: Gregg Lawton, San Francisco, CA (US); Derek Brian Hatchard, New Maryland, CA (US); Bruce Hamilton, San Francisco, CA (US); Chris Myer, Hammonds Plains (CA)

(73) Assignee: salesforce.com, inc., San Francisco, CA (US)

( * ) Notice: Subject to any disclaimer, the term of this patent is extended or adjusted under 35 U.S.C. 154(b) by 300 days.

(21) Appl. No.: 15/431,318

(22) Filed: Feb. 13, 2017

(65) Prior Publication Data
US 2018/0173756 A1    Jun. 21, 2018

Related U.S. Application Data

(60) Provisional application No. 62/437,448, filed on Dec. 21, 2016.

(51) Int. Cl.
| | |
|---|---|
| *G06F 17/30* | (2006.01) |
| *G06F 16/2453* | (2019.01) |
| *G06F 16/248* | (2019.01) |
| *G06F 16/22* | (2019.01) |
| *G06F 16/9535* | (2019.01) |
| *G06F 16/957* | (2019.01) |

(52) U.S. Cl.
CPC .... *G06F 16/24539* (2019.01); *G06F 16/2228* (2019.01); *G06F 16/248* (2019.01); *G06F 16/9535* (2019.01); *G06F 16/9574* (2019.01)

(58) Field of Classification Search
CPC ............ G06F 16/24539; G06F 16/248; G06F 16/2228; G06F 16/9535; G06F 16/9574
See application file for complete search history.

(56) References Cited

U.S. PATENT DOCUMENTS

| | | | |
|---|---|---|---|
| 8,230,062 B2 | 7/2012 | Newton | |
| 8,775,423 B2* | 7/2014 | Pereyra-Rozas | ....... G06Q 50/01 707/600 |
| 9,213,961 B2* | 12/2015 | Strutton | ................. G06Q 50/01 |
| 9,397,974 B1* | 7/2016 | Gross | ...................... H04L 51/32 |

(Continued)

OTHER PUBLICATIONS

Neri et al. "Sentiment Analysis on Social Media"; Aug. 26-29, 2012; IEEE/ACM International Conference on Advances in Social Networks Analysis and Mining; Sentiment Analysis on Social Media (Year: 2012).*

*Primary Examiner* — Debbie M Le
(74) *Attorney, Agent, or Firm* — Morris & Kamlay LLP

(57) ABSTRACT

Provided are technical solutions for preparing and using a cache of social media post data. In an example, a database of social media posts is queried for matching posts and respective metadata for each matching post. Index item data describing one or more respective attributes of each matching post is gathered. For each of the matching posts, the respective index item data is combined with the respective metadata to form combined data. The matching posts and the combined data for each matching post are stored in the cache of social media post data. The cache can be indexed. The cache index can be subsequently queried to provide, for further analysis, social media data which matches specific attributes.

21 Claims, 7 Drawing Sheets

(56) References Cited

U.S. PATENT DOCUMENTS

| | | | | |
|---|---|---|---|---|
| 9,830,404 | B2* | 11/2017 | Huang | G06F 16/90335 |
| 10,127,322 | B2* | 11/2018 | Chakraborty | G06F 16/958 |
| 2008/0228695 | A1* | 9/2008 | Sifry | H04L 67/26 |
| 2009/0048904 | A1 | 2/2009 | Newton et al. | |
| 2009/0157668 | A1 | 6/2009 | Newton et al. | |
| 2009/0281851 | A1 | 11/2009 | Newton et al. | |
| 2012/0047219 | A1* | 2/2012 | Feng | G06Q 30/02 |
| | | | | 709/207 |
| 2014/0040371 | A1* | 2/2014 | Gurevich | H04W 4/21 |
| | | | | 709/204 |
| 2015/0012593 | A1* | 1/2015 | Phillips | H04L 67/2847 |
| | | | | 709/204 |
| 2015/0081571 | A1 | 3/2015 | Chauhan et al. | |
| 2015/0113007 | A1* | 4/2015 | Hatchard | G06Q 10/00 |
| | | | | 707/754 |
| 2016/0259790 | A1* | 9/2016 | Mashiach | G06F 16/9535 |
| 2017/0046390 | A1* | 2/2017 | Jain | G06F 16/2455 |
| 2017/0161272 | A1* | 6/2017 | Tada | G06F 16/248 |
| 2017/0302613 | A1* | 10/2017 | Imbrie | H04L 51/26 |
| 2018/0039691 | A1* | 2/2018 | Hazra | G06F 16/9574 |

\* cited by examiner

FIG. 3

EXPLORE QUERY CACHING

BACKGROUND

Using social media as a communication channel is growing greatly. Many users of social media, also known as "posters," provide their respective opinions, relate their respective experiences, and relate other people's experiences via social media "posts." Thus, topics of social media posts vary widely, and can discuss a variety of different products and services. The social media posts can also include a variety of media types, such as text, audio, video, etc. Further, the social media posts can include weblinks, tags to forward a user to other content, other types of forwarding mechanisms, and other types of relating mechanisms. As an example, a social media poster named Rob can post a social media post including text describing Rob's response to an advertisement: "I am a good man, because I drink SuperDuperCaffeieneBuz Energy Drink." Rob's social media post can also include the advertisement's video, such as a video depicting a bear walking on its hind legs while drinking "SuperDuperCaffieneBuz Energy Drink." Rob's post can also include a tag enabling Rob's post to appear on a feed of another poster. Thus, a single social media post can include much data—each post can easily be over ten megabytes in size.

BRIEF DESCRIPTION OF THE DRAWINGS

The accompanying drawings, which are included to provide a further understanding of the disclosed subject matter, are incorporated in, and constitute a part of, this specification. The drawings also illustrate examples of the disclosed subject matter, and together with the detailed description, serve to explain the principles of examples of the disclosed subject matter. No attempt is made to show structural details in more detail than can be necessary for a fundamental understanding of the disclosed subject matter and various ways in which the disclosed subject matter can be practiced.

FIG. 3 shows an example of a display image depicting results from analyzing the cache of social media post data, according to an example of the disclosed subject matter.

DETAILED DESCRIPTION

Figure 1A:
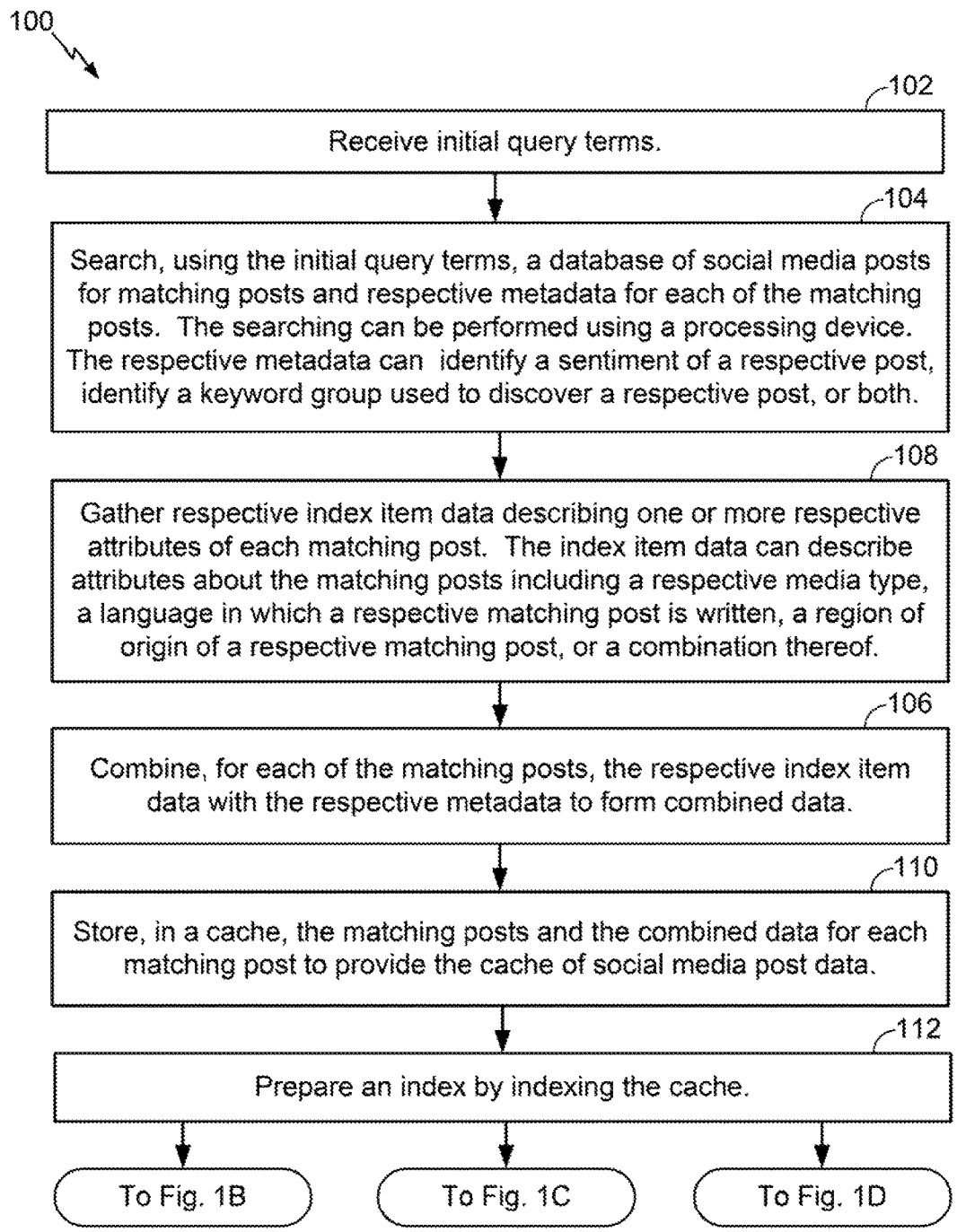
FIGS. 1A, 1B, 1C, and 1D depict a flowchart of an example method to prepare and use a cache of social media post data, according to an example of the disclosed subject matter.

Provided are technical solutions which address and improve upon problems associated with conventional devices and conventional methods.

Conventional computer systems, which perform some types of data analytics on social media posts, aggregate millions of social media posts per day into an extremely large social media database. The social media database stores so much data that the social media database may be implemented with thousands of server computers. Searching the millions of social media posts in the social media database takes a long time due to having to filter the extremely large quantity of data, which leads to slow performance and high bandwidth consumption to access the large number of servers.

Further, the social media database contents change rapidly because millions of people post multiple posts per day. Thus, analyzing the data in the social media database requires performing a refresh search to enable updating analysis results. However, search results for each type of independent analysis must be refreshed separately, which leads to refresh searches being initiated at different times. In other words, performing a refresh search to update the analysis results for one type of independent analysis does not provide a simultaneous refresh search to update analysis results for another type of independent analysis. Thus, the results of multiple types of independent analysis are based on different refresh search results and different post counts. Accordingly, the respective results of the multiple types of independent analysis are inconsistent and cannot be compared with sufficient accuracy.

Accordingly, prior processing techniques result in technical problems of taking too long to timely process the millions of posts to produce analysis results, wasting processor cycles, wasting energy, wasting transmission bandwidth, requiring complex processing, providing accuracy issues with analysis results, wasting processing resources, and wasting time. Accessing the social media database for each search places a high load on the social media database, places a high load on network devices carrying data between the social media database and a user device, and places a high load on Application Programming Interfaces (APIs) through which queries are executed against the social media database.

The provided techniques include technical solutions, such as electronically preparing a cache of social media post data. The cache of social media post data includes less data than a main database of social media posts and can be a "snapshot" in time of a portion of the data in the main database. In examples, different types of analysis can be performed on the cache of social media post data, thus providing a common data source upon which to perform analysis. The analysis can be performed on social media posts occurring over a specific period, in substantially real-time, or both. This type of research is not conventionally available.

In an example, results of the different types of analysis can be used to research issues relating to studying customer opinions on a certain product, service, or both. In an example, the analysis results can be used to segment social media posters into defined market segments, and a specific electronic advertising message can be sent to certain social media posters in certain market segments.

In examples, the provided technical solutions improve upon the aforementioned technical problems which occur when using conventional techniques, and also provide several beneficial advantages. The provided technical solutions can beneficially and advantageously provide consistency in data which is analyzed, provide consistent post counts of the data which is analyzed, enable fast searching of an index instead of a large database of millions of social media posts, search a small number of servers (e.g., one server, two servers, etc.) instead of thousands of servers when analyzing social media post data, provide consistent data for subsequent analysis after a refresh, the like, or a combination thereof. In examples, the provided technical solutions reduce bandwidth use and reduce processing resources necessary to perform data analytics on social media posts, thus making more efficient use of those resources. The provided technical solutions can advantageously save processor cycles, save energy, save transmission bandwidth, save time, save money, the like, or a combination thereof. Further, the provided technical solutions can also advantageously increase data processing efficiency, increase analysis speed, reduce work performed by a processor, provide a system which is easy to use, the like, or a combination thereof.

In examples, the provided technical solutions can also advantageously increase accuracy of data analytics. The provided technical solutions can enable identifying patterns and trends in social media posts, which can lead to more successful electronic communication programs, such as information distribution programs, advertising campaigns, and the like. The provided technical solutions can also identify specific recipients to target with a future electronic message campaign, such as specific recipients to whom advertisements are to be sent. The provided technical solutions can also identify specific recipients that should not be targeted with the future electronic advertising campaign. Thus, the disclosed methods and apparatuses can advantageously and beneficially improve on conventional techniques, and can improve functioning of a machine performing analytics on social media post data.

FIGS. 1A, 1B, 1C, and 1D depict a flowchart of an example method 100 to prepare and use one or more caches of social media post data. In an example, the one or more caches of social media post data can be used to quickly perform analytics on social media post data.

Figure 2:
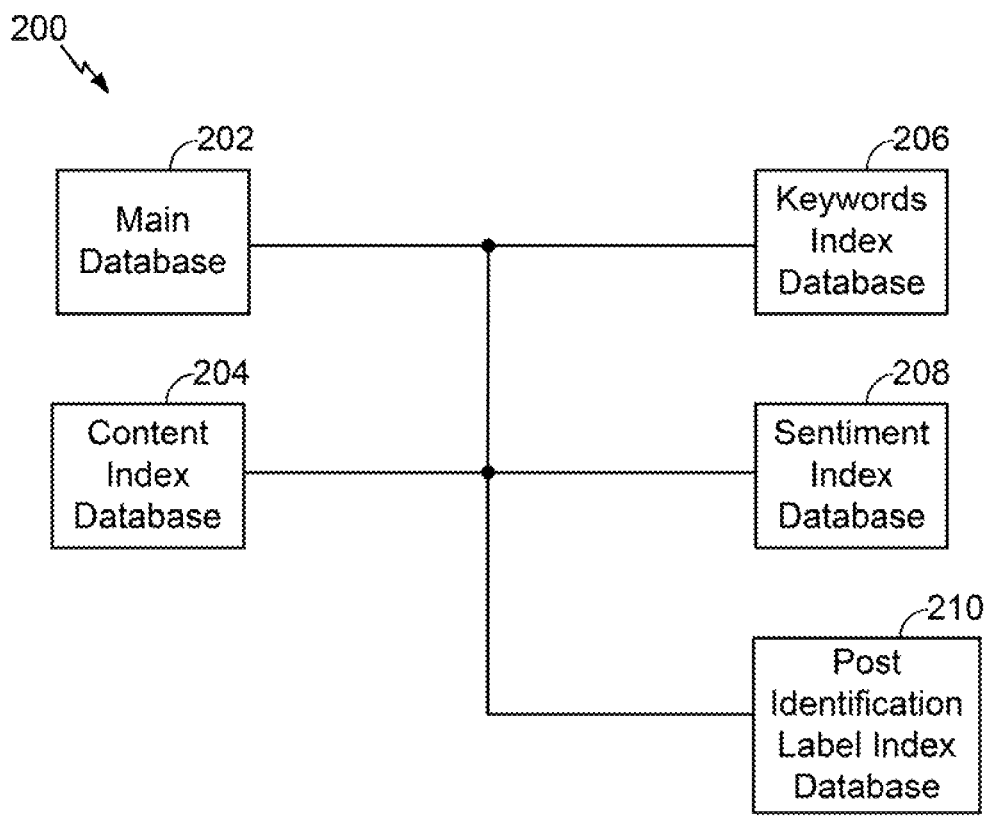
FIG. 2 shows an example of a data storage arrangement, according to an example of the disclosed subject matter.
Figure 4:
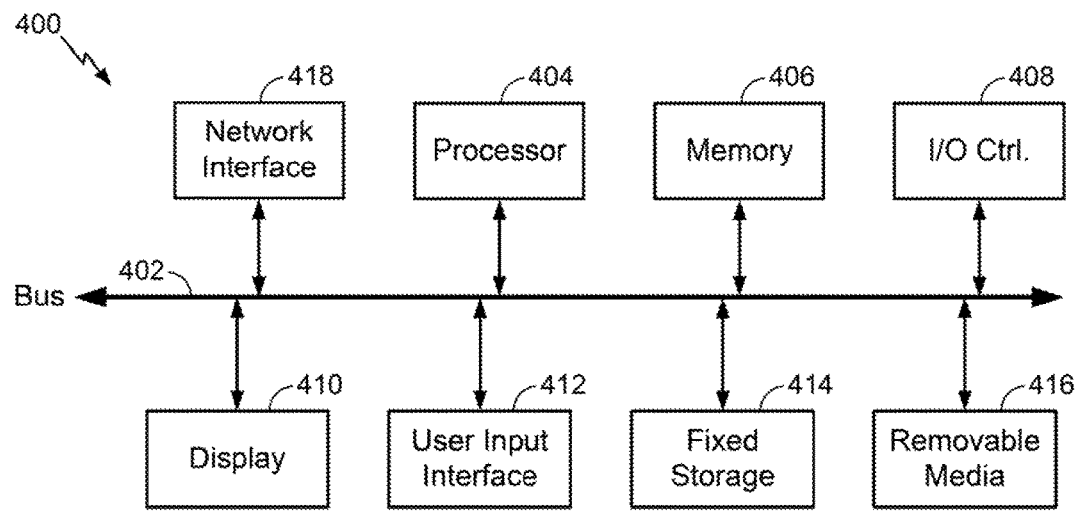
FIG. 4 shows a computer, according to an example of the disclosed subject matter.
Figure 5:
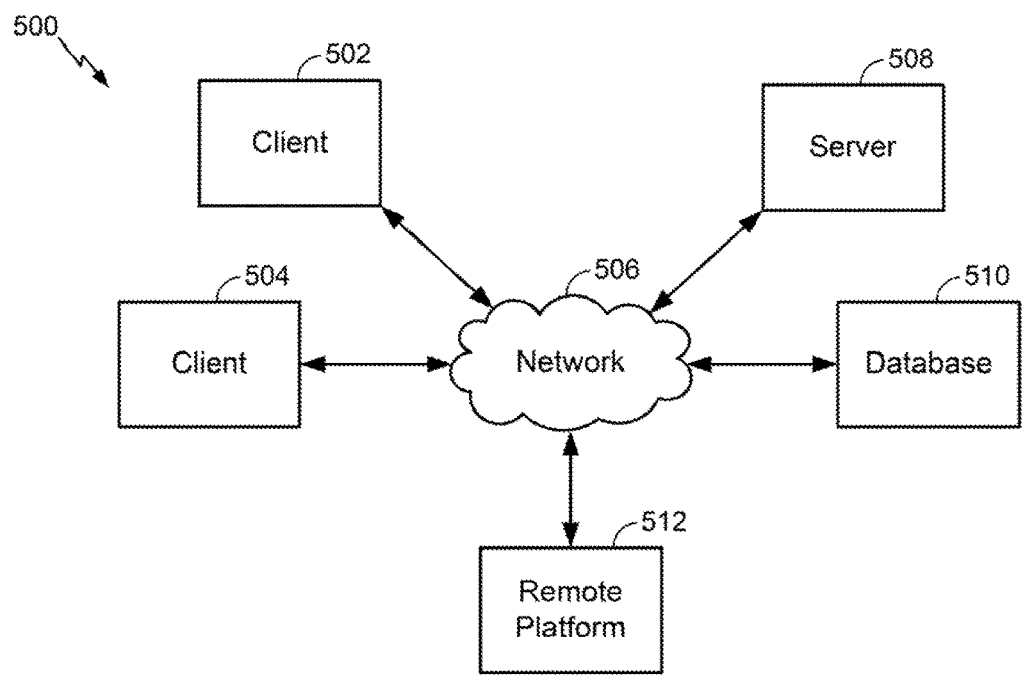
FIG. 5 shows a network configuration, according to an example of the disclosed subject matter.

The electronic devices described herein, such as those described with reference to FIGS. 2 and 4-5, can be configured to perform at least a part of the method 100. The examples depicted in FIGS. 2 and 4-5 are referred to in the following description of the method 100.

In block 102, one or more initial query terms are received. In a non-limiting example, the one or more initial query terms can be data describing: one or more keywords, one or more media types, one or more languages in which a post is written, one or more regions of origin of a post, one or more logos, one or more images, the like, or a combination thereof. Equivalent data can be in the initial query terms. The one or more initial query terms can be received in an ad-hoc exploration of social media post data. In another example, the one or more initial query terms can be received and processed in real-time to provide timely results. Thus, the method 100 enables user-selected filtering of data describing social media posts.

In an example, the one or more initial query terms are received from a storage device, retrieved from the storage device, received via the Internet, received via one or more networks, or a combination thereof. The storage device can include a memory 406 (depicted in FIG. 4), a fixed storage 414, a removable storage medium 416, the like, or a combination thereof. The one or more networks can include one or networks 506 (depicted in FIG. 5). The one or more initial query terms can be received from a user input interface 412, a first client 502, a second client 504, the like, or a combination thereof. The one or more initial query terms can be received at a processing device, such as a processor 404, one or more servers 508, a remote platform 512, the like, or a combination thereof.

In a non-limiting example, the initial query terms can be "#drink," "CaffeineberryBuz," and "Drink." This "CaffeineberryBuz" example is expanded upon below.

In block 104, a database of social media posts is searched, using the initial query terms, for matching posts (that is, social media posts which match the initial query terms) and respective metadata for each of the matching posts. The database of social media posts can include data describing millions (e.g., more than 100 million) of social media posts. In an example, the database of social media posts can be built from an output of a social media crawler. For example, the searched database of social media posts can be stored in a main database 202 (depicted in FIG. 2). The main database 202 can be stored on the database server. The searching can be performed using a processing device, such as the processor 404, the one or more servers 508, the remote platform 512, a database server, the like, or a combination thereof. When the initial query is a logo, an image, or both, the searching can include performing a logo recognition process, an image recognition process, or both. The respective metadata can, for example, identify a sentiment of a respective post, be application-specific (e.g., can identify a keyword group used to discover a respective post), identify a number of "likes" of the post, identify a number of "dislikes" of the post, identify a number of times the post has been shared, the like, or a combination thereof. In examples, the respective metadata can depend on the type of post.

Continuing with the "CaffeineberryBuz" example from above, the search can return, among other posts, a first social media post including a negative review of "CaffeineberryBuz Energy Drink." The first social media post states "#drink CaffeineberryBuz Energy Drink . . . horrible." The search results can include respective first metadata for the first social media post including data describing that the author's name is Shawn, the first post originated in the United States, the first post has an associated negative sentiment, the media type is Mainstream News, the first post was written in the English language, and the first post has an identification number of 535,933,232. In some implementations, the first metadata may include the number of "likes" that the first post has received, and the number of times the first post has been shared with others on the same or different social media platforms. In this example, the search can also return a second social media post including a positive review of "CaffeineberryBuz Energy Drink." The second social media post states "#drink CaffeineberryBuz Energy Drink . . . yummy!" The search results can include respective second metadata for the second social media post including describing that the author's name is Bob, the second post originated in the United States, the second post has an associated positive sentiment, the media type is Twitter®, the second post was written in the English language, and the second post has an identification number of 955,334,999.

In block 106, respective index item data describing one or more respective attributes of each matching post is gathered. For example, the respective attributes can be identified, retrieved, the like, or a combination thereof. In examples, the index item data can describe attributes about the matching posts including a respective media type, a language in which a respective matching post is written, a region of origin of a respective matching post, a sentiment of a respective matching post, or a combination thereof. The index item data can include data describing: the matching post, a BlogId (for example, identifying a source of the post), a media type (for example identifying a Twitter® post, a Facebook® post, the like, or a combination thereof), an extended media type having a higher level of detail than the media type (for example, for a post, a comment, a reply, an inbox message, the like, or a combination thereof), a media provider (such as a process used to get it), a region id, a status, a language of the post, a date the matching post was published, a sentiment, an author, the like, or a combination thereof. In examples, the index item data can include data describing: a following count, a follower count, a tweet count, an inbound link count, a vote count, an engagement, a commenter count, a comment count, the like, or a combination thereof.

The gathering can be performed using a processing device, such as the processor 404, the one or more servers 508, the remote platform 512, the database server, the like, or a combination thereof. The respective index item data can be stored, for example, in one or more respective databases, such as a content index database 204, a keywords index database 206, a sentiment index database 208, a post identification label index database 210, the like, or a combination thereof. At least a portion of: the content index database 204, the keywords index database 206, the sentiment index database 208, the post identification label index database 210, the like, or the combination thereof can be stored in the memory 406, the fixed storage 414, the removable media 416, the one or more servers 508, a database 510, or a combination thereof.

Continuing with the "CaffeineberryBuz" example, index item data can include data describing the keyword "CaffeineberryBuz," data describing social media post identification number 535,933,232 (associated with the first post), data describing social media post identification number 955,334,999 (associated with a second post), data describing Twitter® (an example media type), data describing Mainstream News, data describing English (an example language type), data describing the tag "#drink," and the like.

In block 108, the respective index item data is combined, for each of the matching posts, with the respective metadata to form combined data. The combining can be performed using a processing device, such as the processor 404, the one or more servers 508, the remote platform 512, the database server, the like, or a combination thereof.

In block 110, the matching posts and the combined data for each matching post are stored in a first cache of social media post data. In an example, the first cache stores a minimal amount of data, such as by storing identifiers of the respective metadata and identifiers of the respective index item data. For example, if a mediatypeID=1 for a mediatype of Twitter®, then the identifier of "1" is stored in the first cache. Thus, the first cache of social media post data includes less data than the main database of social media posts and can be a "snapshot" in time of a portion of the data in the main database. Different types of searches, analysis, or both can be performed on the first cache of social media post data, thus providing a common data source upon which to base analysis results. In an example, the first cache can also be known as a "resultset cache."

In an example, the first cache of social media post data can be stored in the main database 202. In another example, the first cache of social media post data can be stored in a machine which is separate from the storage device storing the main database 202. Storing the first cache of social media post data in a separate machine advantageously enables fast retrieval of the combined data and reduces network loading. In examples, the first cache of social media post data can be stored in a computer 400, the first client 502, the second client 504, the one or more servers 508, the database 510, the remote platform 512, the database server, the like, or a combination thereof.

The first cache of social media post data can advantageously provide consistency in the data which is analyzed, provide consistent post counts of data which is analyzed, provide consistent data for subsequent analysis, or a combination thereof. The first cache of social media post data includes less data than the main database of social media posts and can be a "snapshot" in time of a portion of the data in the main database. In examples, different types of analysis can be performed on the first cache of social media post data, thus providing a common data source upon which to perform analysis.

In block 112, the first cache is indexed, and a cache index is prepared. For example, the cache index can be a dynamically-created database table structure where different attributes are indexed. Indexing in the block 112 can include updating, based on the combined data in the first cache of social media post data, cross-reference information in the content index database 204, the keywords index database 206, the sentiment index database 208, the post identification label index database 210, the like, or a combination thereof. The indexing can be performed using a processing device, such as the processor 404, the one or more servers 508, the remote platform 512, the database server, the like, or a combination thereof.

In an example, the cache index prepared by performing the block 112 can be stored in the memory 406, the fixed storage 414, the removable storage medium 416, the database server, the like, or a combination thereof. In an example, the cache index prepared in the block 112 can be stored in the first client 502, the second client 504, the one or more servers 508, the database 510, the remote platform 512, the database server, the like, or a combination thereof. In an example, the cache index can be prepared in separate iterations on two or more storage devices (e.g., servers), a best-performing storage device is identified, and a search of the index is performed using the best-performing storage device.

The cache index can advantageously enable fast searching of the cache index instead of a large database of millions of social media posts, enable searching a small number of servers (e.g., one server, two servers, etc.) instead of thousands of servers when analyzing social media post data, or a combination thereof. This advantageously reduces loading of the main database, API nodes, network devices, the like, and a combination thereof.

Continuing with the "CaffeineberryBuz" example, after indexing, the cache index can include an entry associating the data describing the keyword "CaffeineberryBuz" with two social media post identification numbers: 535,933,232 (associated with the first post), and 955,334,999 (associated with a second post). The index item data can include an entry of Twitter® (an example media type) indexed to, among other post identification numbers, the post identification number 955,334,999. An entry of Mainstream News can be indexed to, among other post identification numbers, the post identification number 535,933,232. An entry of English (an example language type) can be indexed to, among other post identification numbers, the post identification number 955,334,999 and the post identification number 535,933,232. An entry of "#drink" indexed to, among other post identification numbers, the post identification number 955,334,999 and the post identification number 535,933,232.

Figure 1B:
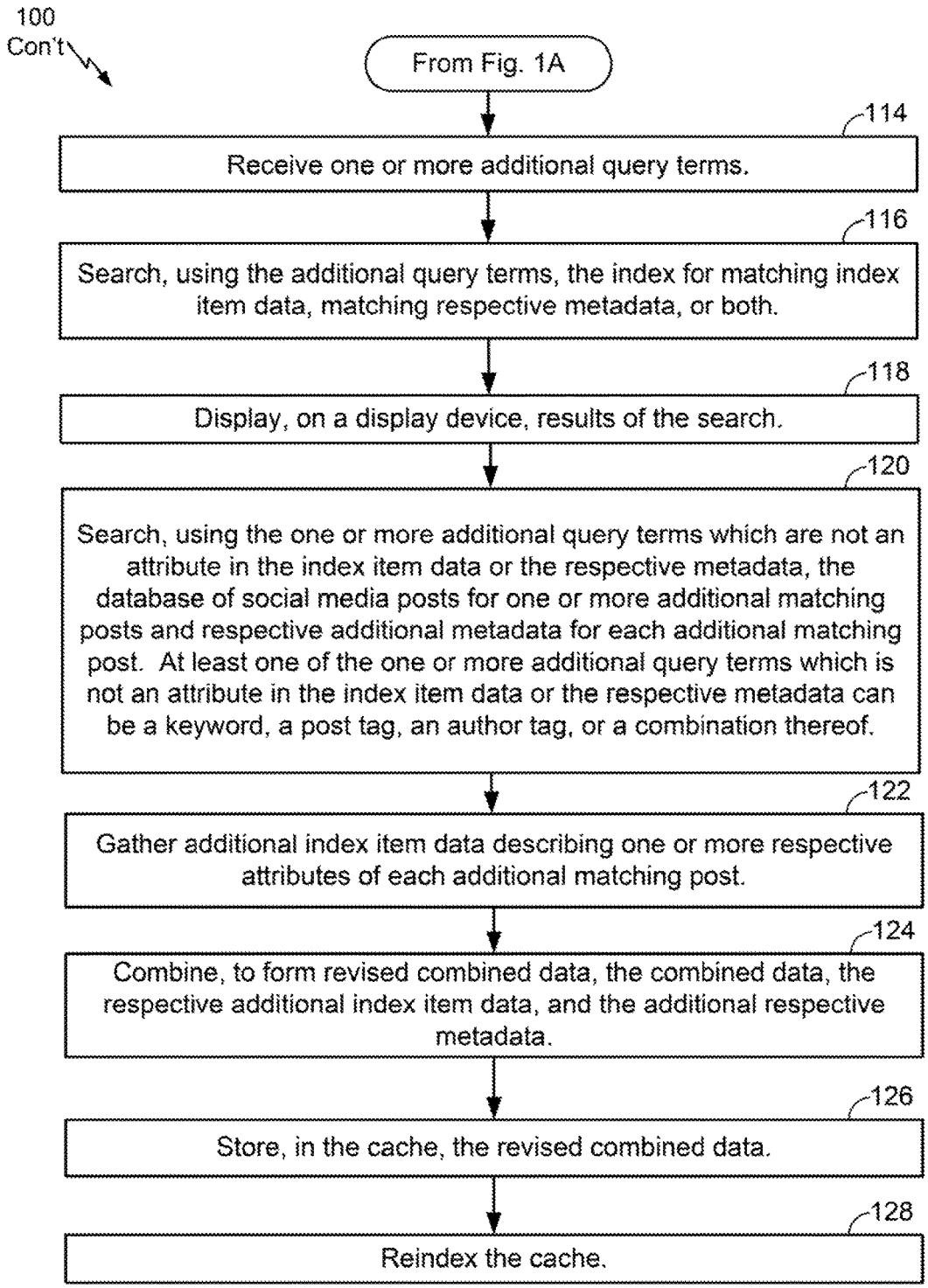
Figure 1C:
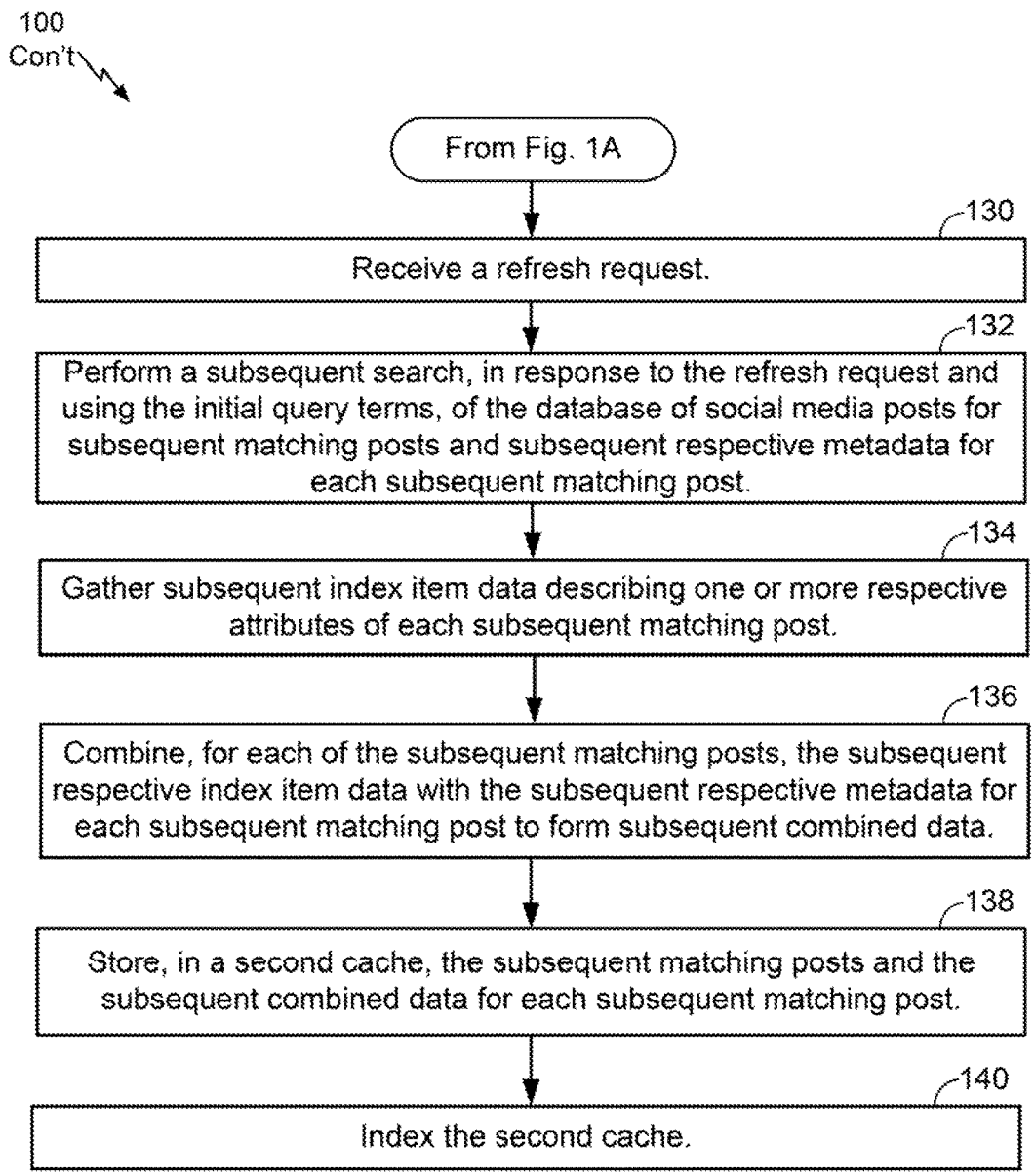
Figure 1D:
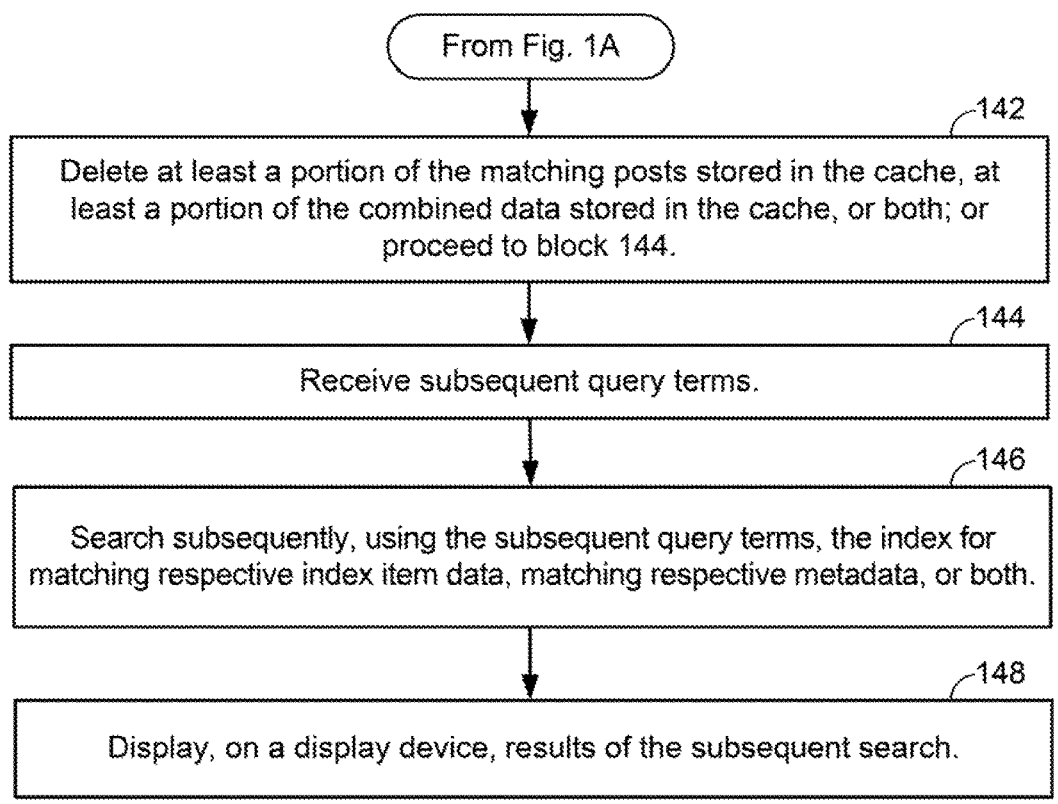

The method 100 can proceed to at least one of FIG. 1B, 1C, or 1D after the block 112 is performed.

FIG. 1B describes optional techniques for searching the index and updating the first cache.

In optional block 114, one or more additional query terms is received. In an example, the one or more additional query terms can be received and processed in real-time to provide timely results. The one or more additional query terms can be received from a storage device, retrieved from the storage device, received via the Internet, received via one or more networks, or a combination thereof. The storage device can include the memory 406, the fixed storage 414, the removable storage medium 416, the database server, the like, or a combination thereof. The one or more networks can include the one or more additional networks 506. The one or more additional query terms can be received from the user input interface 412, the first client 502, the second client 504, the like, or a combination thereof. The one or more additional query terms can be received at a processing device, such as the processor 404, the one or more servers 508, the remote platform 512, the database server, the like, or a combination thereof.

In optional block 116, the cache index is searched, using the one or more additional query terms, for matching index item data (that is, index item data which matches the one or more additional query terms), matching respective metadata, or both. The searching in the block 116 can include querying, using the one or more additional query terms, cross-reference information in the content index database 204, the keywords index database 206, the sentiment index database 208, the post identification label index database 210, the like, or a combination thereof. The searching can be performed using a processing device, such as the processor 404, the remote platform 512, the database server, the like, or a combination thereof.

Searching the cache index, instead of searching the database of social media posts in the main database, can advantageously reduce bandwidth and processing resources necessary to perform data analytics on social media posts, save processor cycles, save energy, save transmission bandwidth, save time, save money, increase data processing efficiency, increase analysis speed, reduce work performed by a processor, provide a system which is easy to use, or a combination thereof. In an example, the cache index is searched using the database server, which can be one or more servers storing the main database. Thus, the cache index can be quickly searched because the cache index is a minimized data set being searched by a fast and powerful server.

In optional block 118, results of the index search are output. In an example, the output can be sent to another program for processing, sent to another device for processing, displayed on a display device, the like, or a combination thereof. For example, the results of the index search can be displayed on a display 410.

In optional block 120, the database of social media posts (e.g., the main database 202) is searched, using one or more additional query terms which are not an attribute in the index item data or the respective metadata, for one or more additional matching posts and respective additional metadata for each additional matching post. When a new type of attribute is used in social media posts, performing the block 120 updates the cache with the new type of attribute. For example, if a new type of tag is introduced, then performing the block 120 enables including data describing the new type of tag into the cache of social media posts. At least one of the one or more additional query terms which is not an attribute in the index item data or the respective metadata can be a keyword, a post tag, an author tag, or a combination thereof. The searching can be performed using a processing device, such as the processor 404, the one or more servers 508, the remote platform 512, the database server, the like, or a combination thereof.

In optional block 122, additional index item data describing one or more respective attributes of each additional matching post is gathered. The gathering can be performed using a processing device, such as the processor 404, the one or more servers 508, the remote platform 512, the database server, the like, or a combination thereof.

In optional block 124, the combined data, the respective additional index item data, and the additional respective metadata are combined to form revised combined data. The combining can be performed using a processing device, such as the processor 404, the one or more servers 508, the remote platform 512, the database server, the like, or a combination thereof.

In optional block 126, the revised combined data is stored in the first cache. Revising the first cache of social media post data can advantageously provide consistency in the data which is analyzed, provide consistent post counts of data which is analyzed, provide consistent data for subsequent analysis after a refresh, or a combination thereof.

In optional block 128, the first cache is reindexed. In some implementations, data that is newly added to the first cache (e.g., the revised combined data) is indexed within the first cache. That is, the first cache is reindexed with respect to the newly-added data. For example, the dynamically-created database table structure where different attributes are indexed can be reindexed. Reindexing in the block 128 can include updating, based on the revised combined data in the first cache of social media post data, cross-reference information in the content index database 204, the keywords index database 206, the sentiment index database 208, the post identification label index database 210, the like, or a combination thereof. The reindexing can be performed using a processing device, such as the processor 404, the remote platform 512, the database server, the like, or a combination thereof.

In an example, the cache index prepared by performing the block 128 can be stored in the memory 406, the fixed storage 414, the removable storage medium 416, the database server, the like, or a combination thereof. In an example, the cache index prepared in the block 128 can be stored in the first client 502, the second client 504, the one or more servers 508, the database 510, the remote platform 512, the database server, the like, or a combination thereof.

The reindexing can advantageously enable fast searching of the updated index instead of a large database of millions of social media posts, enable searching a small number of servers (e.g., one server, two servers, etc.) instead of thousands of servers when analyzing social media post data, or a combination thereof.

In examples, the cache index prepared in the block 128 can be searched to produce search results. Data analytics can be performed on the search results. Searching the cache index prepared in the block 128, instead of searching the database of social media posts in the main database, can advantageously reduce bandwidth and processing resources necessary to perform data analytics on social media posts, save processor cycles, save energy, save transmission bandwidth, save time, save money, increase data processing efficiency, increase analysis speed, reduce work performed by a processor, provide a system which is easy to use, or a combination thereof.

FIG. 1C describes optional techniques for refreshing and updating cache data and the cache index. The contents of the database of social media posts can change rapidly over time, thus refreshing the data stored in the cache can provide substantially up-to-date data upon which analysis can be performed.

In optional block 130, a refresh request is received. A user can request a refresh or otherwise control refresh timing, thus making the first cache, the second cache, etc. user-controllable. The refresh request can be received via the user input interface device 412, or another user-input device. The refresh request can be received at a processing device, such as the processor 404, the one or more servers 508, the remote platform 512, the database server, the like, or a combination thereof.

In optional block 132, a subsequent search is performed, in response to the refresh request and using the initial query terms, of the database of social media posts. The subsequent search is for subsequent matching posts (that is, social media posts which match the initial query terms), as well as for subsequent respective metadata for each subsequent matching post. The subsequent searching can be performed using a processing device, such as the processor 404, the one or more servers 508, the remote platform 512, the database server, the like, or a combination thereof.

In optional block 134, subsequent index item data is gathered. The subsequent index item data describes one or more respective attributes of each subsequent matching post. The gathering can be performed using a processing device, such as the processor 404, the one or more servers 508, the remote platform 512, the database server, the like, or a combination thereof.

In optional block 136, the subsequent respective index item data is combined, for each of the subsequent matching posts, with the subsequent respective metadata for each subsequent matching post. The combination forms subsequent combined data. The combining can be performed using a processing device, such as the processor 404, the one or more servers 508, the remote platform 512, the database server, the like, or a combination thereof.

In optional block 138, the subsequent matching posts and the subsequent combined data for each subsequent matching post are stored in a second cache. Optionally, the data in the first cache prepared in the block 110 is overwritten with the data that would otherwise be stored in the second cache, to save storage space.

The second cache of social media post data can be stored in the main database 202. In another example, the second cache of social media post data can be stored in a machine which is separate from the storage device storing the main database 202. Storing the second cache of social media post data in a separate machine beneficially enables fast retrieval of the combined data, and reduces loading on network devices. The separate machine can be the computer 400, the first client 502, the second client 504, the like, or a combination thereof.

Using the second cache advantageously enables comparative analysis between data stored in the cache prepared in the block 110 and data stored in the second cache prepared in the block 138. For example, the comparative analysis can include identifying and analyzing trends over time. The second cache of social media post data can advantageously provide consistency in the data which is analyzed, provide consistent post counts of data which is analyzed, provide consistent data for subsequent analysis after a refresh, or a combination thereof.

In optional block 140, the second cache is indexed. For example, the index of the second cache can be a dynamically-created database table structure where different attributes are indexed. The indexing in the block 140 can include updating, based on the subsequent combined data in the second cache of social media post data, cross-reference information in the content index database 204, the keywords index database 206, the sentiment index database 208, the post identification label index database 210, the like, or a combination thereof. The indexing can be performed using a processing device, such as the processor 404, the one or more servers 508, the remote platform 512, the database server, the like, or a combination thereof.

In an example, an index prepared by performing the block 140 can be stored in the memory 406, the fixed storage 414, the removable storage medium 416, the database server, the like, or a combination thereof. In an example, an index prepared by performing the block 140 can be stored in the first client 502, the second client 504, the one or more servers 508, the database 510, the remote platform 512, the database server, the like, or a combination thereof.

The indexing of the second cache can advantageously enable fast searching of the index of the second cache instead of a large database of millions of social media posts, enable searching a small number of servers (e.g., one server, two servers, etc.) instead of thousands of servers when analyzing social media post data, or a combination thereof.

In examples, the index of the second cache of social media posts can be searched to produce search results. Data analytics can be performed on the search results. Searching the index of the second cache of social media posts, instead of searching the database of social media posts in the main database, can advantageously greatly reduce bandwidth and processing resources necessary to perform data analytics on social media posts, save processor cycles, save energy, save transmission bandwidth, save time, save money, increase data processing efficiency, increase analysis speed, reduce work performed by a processor, provide a system which is easy to use, the like, or a combination thereof.

FIG. 1D describes optional processing techniques.

In optional block 142, at least a portion of the matching posts stored in the first cache, the second cache, or both can be deleted. Further, at least a portion of the combined data stored in the first cache, the second cache, or both can be deleted. Further, at least a portion of data stored in the first cache, the second cache, or both can be deleted. The deleting can be controlled using a processing device, such as the processor 404, the one or more servers 508, the remote platform 512, the database server, the like, or a combination thereof. In an example, when a cache, such as the first cache, is deleted, a new cache, such as the second cache, can be constructed.

In optional block 144, one or more subsequent query terms are received. In an example, the one or more subsequent query terms can be received and processed in real-time to provide timely results. In an example, the one or more subsequent query terms are received from a storage device, retrieved from the storage device, received via the Internet, received via one or more networks, or a combination thereof. The storage device can include the memory 406, the fixed storage 414, the removable storage medium 416, the like, or a combination thereof. The one or more networks can include the one or networks 506. The one or more subsequent query terms can be received from the user input interface 412, the first client 502, the second client 504, the like, or a combination thereof. The one or more subsequent query terms can be received at a processing device, such as the processor 404, the one or more servers 508, the remote platform 512, the database server, the like, or a combination thereof.

In optional block 146, the cache index is searched subsequently, using the one or more subsequent query terms, for matching respective index item data, matching respective metadata, or both. The searching in the block 146 can include querying, using the one or more subsequent query terms, cross-reference information in the content index database 204, the keywords index database 206, the sentiment index database 208, the post identification label index database 210, the like, or a combination thereof. The subsequent searching can be performed using a processing device, such as the processor 404, the one or more servers 508, the remote platform 512, the database server, the like, or a combination thereof.

Subsequently searching the cache index, using the one or more subsequent query terms, instead of searching the database of social media posts in the main database, can advantageously reduce bandwidth and processing resources necessary to perform data analytics on social media posts, save processor cycles, save energy, save transmission bandwidth, save time, save money, increase data processing efficiency, increase analysis speed, reduce work performed by a processor, provide a system which is easy to use, or a combination thereof.

In optional block 148, results of the subsequent search can be output. In an example, the output can be sent to another program for processing, sent to another device for processing, displayed on a display device, the like, or a combination thereof. For example, the results of the search can be displayed on the display 410.

Figure 3:
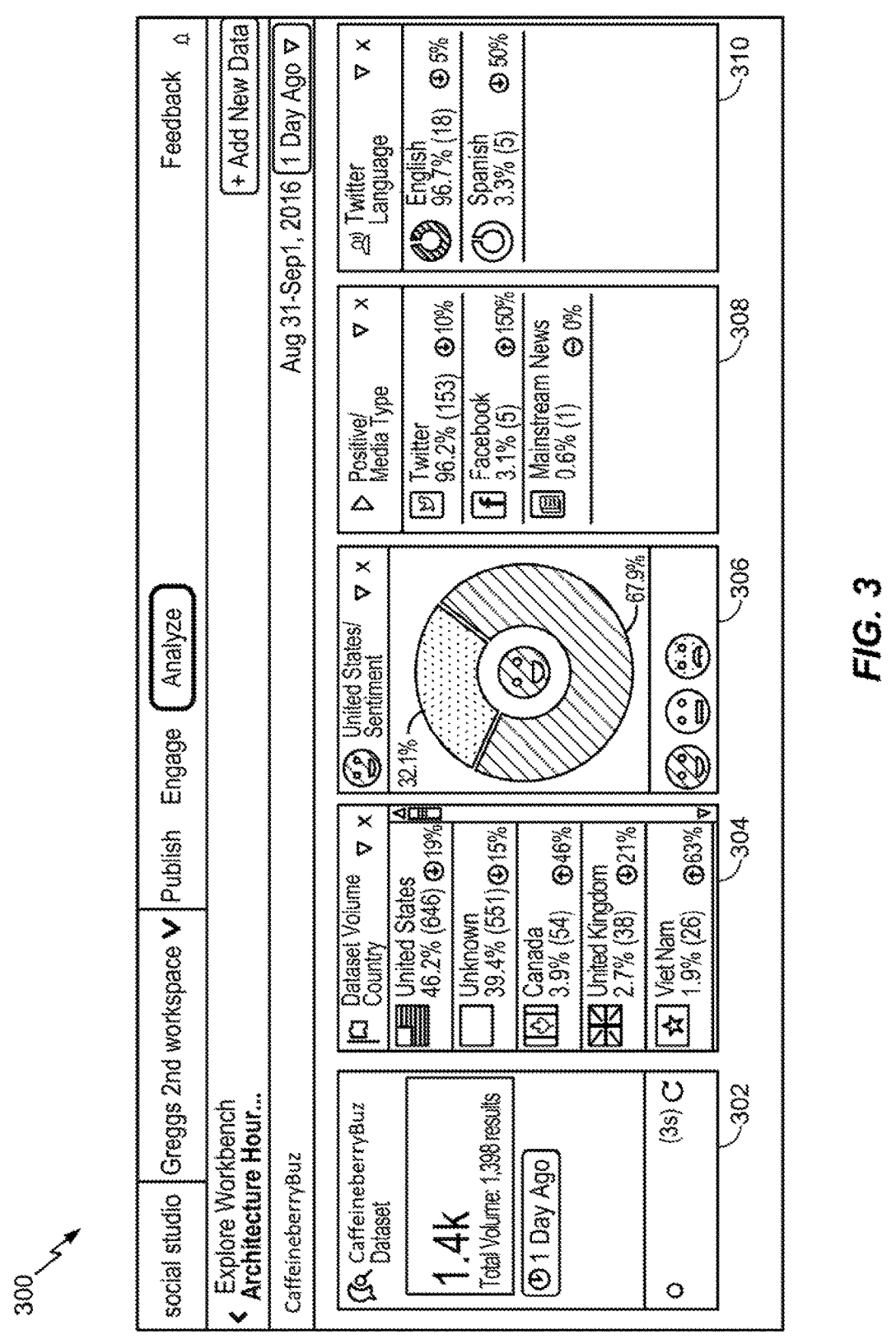

The caches and indexes described herein can be used when performing social media monitoring. In an example, data in at least one of the described indices can be analyzed and the results of the analysis can be displayed. The analysis can be based on one, or more, of the index item data, the matching post's respective metadata, the like, or both. Performing different types of analysis on the same data in a cache can advantageously increase accuracy of data analytics by removing errors resulting from different post counts and by removing errors resulting from analyzing data gathered over different time periods. In an example, one or more of the results of the analysis, the like, or a combination thereof can be displayed on a user display. FIG. 3 depicts examples of results from analyzing the cache of social media post data.

In an example, analysis results, the like, or a combination thereof can be used to research issues relating to studying customer opinions on a certain product, service, or both. The analysis can be performed on social media posts occurring over a specific period of time, in real-time, or both. This type of research is not conventionally available.

In an example, the analysis results, the like, or a combination thereof can be used to segment social media posters into defined market segments, and a specific advertising message can be sent to certain social media posters in certain market segments. Further, certain social media posters can be targeted with message advertising, special messaging, product recommendations, discount updates, the like, or a combination thereof. Moreover, social media posters who are not likely to perform a conversion can be targeted with a win-back advertising campaign (e.g., by offering an incentive to shop with your brand). This can beneficially increase accuracy and efficiency by reducing processor cycles, saving energy, saving transmission bandwidth, and saving sender and recipient time on transmitting ineffective messages to recipients.

In an example, when any of the caches, indexes, or both are no longer needed (e.g., after expiration of a timer, after a defined period of disuse, the like, or a combination thereof), the respective cache index can be expired. In an example, an expired cache is automatically deleted, such as by a separate process. In an example, an automatic deletion approval command indicating that the cache is to be automatically deleted is received (e.g., from a user), and the cache is subsequently automatically deleted. If the automatic deletion approval command indicates that the cache is not to be automatically deleted, then the cache is not automatically deleted. In an example, an expired cache can be deleted in response to receiving a manual deletion command (e.g., from a user) indicating that the cache is to be deleted. If a query is made against an expired cache, then the query can initiate performing blocks 102 through 112 to rebuild the first cache and the index.

One or more posts, one or more keywords, one or more communications (e.g., to a user, from a user), the like, or a combination thereof can be in at least one language, such as English, Traditional Chinese, Simplified Chinese, a combination of Traditional Chinese and Simplified Chinese, Japanese, Korean, Dutch, French, German, Italian, Portuguese, Spanish, emoticons, the like, or a combination thereof.

At least a portion of the method 100 can be implemented using a host computing infrastructure. The host infrastructure can include at least a processor and a memory. A user interface operating at a user client device located remotely from the host infrastructure can communicatively interface with the host infrastructure via a public Internet. The host infrastructure can operate as a cloud-based service provider to the user client device. Using a cloud-based service provider enables scaling a number of processors used to perform at least a part of a method described herein, which advantageously reduces processing cycles, energy, and processing expenses.

In an example, at least a portion of the methods described herein can be performed by the user client device (e.g., a user's computer), a computer remote from the user's computer (e.g., a cloud-based computing arrangement), a server, a cloud-based processing device, the like, or a combination thereof. In an example, at least a portion of the methods described herein can be initiated by the user client device (e.g., the user's computer), the computer remote from the user's computer (e.g., the cloud-based computing arrangement), the server, the cloud-based processing device, the like, or a combination thereof.

FIG. 2 shows an example of a data storage arrangement 200 including different data stores. In some implementations, the data store arrangement 200 may include one or more of a main database 202, a context index database 204, a keywords index database 206, a sentiment index database 208, and a post identification label index database 210, which are described in detail below. Information stored in the data storage arrangement 200 can be retrieved and processed, as is practicable, using at least a portion of the methods described herein. The data storage arrangement 200 can be implemented at least in part with one or more electronic devices such as the memory 406, the fixed storage 414, the removable storage medium 416, the database server, the like, or a combination thereof. Further, the data storage arrangement 200 can be implemented at least in part with one or more electronic devices such as the first client 502, the second client 504, the one or more servers 508, the database 510, the remote platform 512, the like, or a combination thereof. In another example, the data storage arrangement 200 can be implemented with one or more electronic devices, such as a cloud-based storage device. The structures depicted by, and arrangement of features in, the data storage arrangement 200 is illustrative, and is not limiting.

The data storage arrangement 200 can include the main database 202, which is a content database including the database of social media posts (for example, hundreds of millions of social media posts), social media post text, metadata associated with social media posts, data describing one or more social media posts, one or more caches of social media post data (such as the first cache, the second cache, or both), the like, or a combination thereof.

Continuing with the "CaffeineberryBuz" example, the main database 202 includes, among other posts, the first social media post including the negative review of "CaffeineberryBuz Energy Drink" and the second social media post including the positive review of "CaffeineberryBuz Energy Drink." The main database 202 also includes the metadata associated with these two posts.

The data storage arrangement 200 can include the content index database 204, which can include data describing content descriptions, such as those discussed above. In some implementations, the content index database 204 may include the text, images, video, and/or audio included in a post that is written. The content index database 204 can include cross-references between the content descriptions and an identifier (e.g., post number) of one or more specific posts.

Continuing with the "CaffeineberryBuz" example, the content index database 204 can include a first entry of "CaffeineberryBuz" indexed to, among other post identification numbers, the post identification number 955,334,999 and the post identification number 535,933,232. The content index database 204 can include a second entry of "energy" indexed to, among other post identification numbers, the post identification number 955,334,999 and the post identification number 535,933,232. Thus, a query of the content index database 204 for "CaffeineberryBuz" yields, among other post identification numbers, post identification number 955,334,999 and the post identification number 535,933, 232.

The data storage arrangement 200 can include the keywords index database 206, which can include data describing keywords, the like, or a combination thereof. The keywords can describe a media type of one or more posts, a language in which one or more posts is written, a region of origin of one or more posts, a post tag, an author tag, the like, or a combination thereof. The keywords index database 204 can include cross-references between the data describing the keywords and an identifier (e.g., post number) of one or more specific posts.

Continuing with the "CaffeineberryBuz" example, the keywords index database 206 can include a first entry of Twitter® (an example media type) indexed to, among other post identification numbers, the post identification number 955,334,999. The keywords index database 206 can also include a second entry of Mainstream News indexed to, among other post identification numbers, the post identification number 535,933,232. The keywords index database 206 can include a third entry of English (an example language type) indexed to, among other post identification numbers, the post identification number 955,334,999 and the post identification number 535,933,232. Thus, a query of the keywords index database 206 for "media type=Twitter" yields, among other post identification numbers, post identification number 955,334,999. The keywords index database 206 can include an entry associating data describing the keyword "CaffeineberryBuz" with two social media post identification numbers: 535,933,232 (associated with the first post), and 955,334,999 (associated with a second post). Thus, a query of the keywords index database 206 for the term "CaffeineberryBuz" yields two associated post identification numbers, post number 535,933,232 and post number 955,334,999.

The data storage arrangement 200 can include the sentiment index database 208, which can include data describing an index of sentiment descriptions, the like, or a combination thereof.

Continuing with the "CaffeineberryBuz" example, the sentiment index database 208 can include a first entry of "positive sentiment" indexed to, among other post identification numbers, the post identification number 955,334,999. The sentiment index database 208 can also include a second entry of "negative sentiment" indexed to, among other post identification numbers, the post identification number 535, 933,232. Thus, a query of the sentiment index database 208 for "sentiment type=positive" yields, among results, post identification number 955,334,999.

The data storage arrangement 200 can include the post identification label index database 210, which can include data describing an index of identification labels for posts in the main database 202, the like, or a combination thereof.

Continuing with the "CaffeineberryBuz" example, the post identification label index database 210 can include a post identification label of "#drink" indexed to, among other post identification numbers, the post identification number 955,334,999 and the post identification number 535,933, 232. Thus, a query of the post identification label index database 210 for "#drink" yields, among other post identification numbers, post identification numbers 955,334,999 and 535,933,232.

FIG. 3 shows an example of a display image 300 depicting analysis results from analyzing the cache of social media post data. The social media post data can be analyzed based on factors such as volume trend, country of origin, language, top words, sentiment, post label, assignment, media type, the like, or a combination thereof. The display image 300 depicts several display portions, each of which depict analysis results, and each of which can also be referred to individually as a "card" or a "widget." The analysis results depicted can result from an independent query against a cache, an index, or both. In an example, the analysis results depicted can result from shared query results from a query against a cache, an index, or both. In an example, the display image 300 can be at least a part of a "workbench." The data displayed in the display image 300 can be retrieved from the cache of social media post data by querying one or more indexes, such as one or more of the indices depicted in the data storage arrangement 200. The display image 300 is merely an example, and does not include all of the possible cards or widgets that may present data. The cards and/or widgets may include, for example, the entirety of the cache of social media post data, a breakdown of the social media posts represented by the data in the cache of social media post data by country of origin of the post, a breakdown of the respective sentiment of social media posts represented by the data in the cache of social media post data, a breakdown of the respective media type of social media posts represented by the data in the cache of social media post data, a breakdown of the respective language of social media posts represented by the data in the cache of social media post data, or the like. These cars and/or widgets are merely examples, and additional analytics can be created from the data in the cache, and new cards and/or widgets may be created and displayed in the display image 300.

A first display portion 302 depicts substantially an entirety of the cache of social media post data. The first display portion 302 can depict a count (i.e., total number) of social media posts represented by the data in the cache of social media post data, the initial query terms used to build the cache of social media post data, a date range within which the social media posts represented by the cache of social media post data were posted, a refresh button, the like, or a combination thereof.

In the example depicted in FIG. 3, the first display portion 302 depicts that the cache of social media post data represents approximately 1.4 thousand posts and that the posts were made within a prior 24-hour period.

A second display portion 304 depicts a breakdown of the social media posts represented by the data in the cache of social media post data by country of origin of the post. The second display portion 304 can display a title of each country of origin, a percentage of posts originating from one or more respective countries, a number of posts originating from one or more respective countries, a change in the percentage over a defined period of time (e.g., one day, one week, one month, one year, the like, etc.), the like, or a combination thereof.

The countries of origin can be displayed in order by country having the highest percentage to country having the lowest percentage. Conversely, the countries of origin can be displayed in order by country having the lowest percentage to country having the highest percentage.

In the example depicted in FIG. 3, the second display portion 304 depicts that the 46.2% of the posts in the cache of social media post data originated from the United States, that 646 of the posts in the cache of social media post data originated from the United States, and that the percentage of posts in the cache of social media post data originated from the United States has decreased 19% in the past day.

A third display potion 306 depicts a breakdown of the respective sentiment of social media posts represented by the data in the cache of social media post data, where the country of origin of the posts is the United States.

The respective sentiment can be displayed as a percentage which is positive, a percentage which is negative, a percentage which is neutral, the like, or a combination thereof. In an example, the average numerical value of sentiment can be displayed in a pictorial form. For example, negative sentiment can be communicated with a picture (e.g., an emoticon) of a frowning face, positive sentiment can be communicated with a picture of a smiling face, and neutral sentiment can be communicated with a picture of a face which displays no emotion. In another example, the respective sentiment can be described with words.

In an example, the respective sentiment can be displayed as a number of social media posts which are positive, a number of social media posts which are negative, a number of social media posts which are neutral, the like, or a combination thereof.

In the example depicted in FIG. 3, the third display potion 306 depicts that the 32.1% of the posts in the cache of social media post data which originated from the United States have negative sentiment, 67.9% of the posts in the cache of social media post data which originated from the United States have positive sentiment, the overall average of posts in the cache of social media post data which originated from the United States have positive sentiment (as identified by the large smiley face in the center of the chart), and zero percent of the posts in the cache of social media post data which originated from the United States have neutral sentiment.

A fourth display portion 308 depicts a breakdown of the respective media type of social media posts represented by the data in the cache of social media post data, where the country of origin of the posts is the United States, and where the sentiment is positive.

The media type can be a name of a service, a social networking website, a social networking application, an interactive platform, a social media platform, a blog, the like, or a combination thereof upon which a poster can post one or more social media posts.

The fourth display portion 308 can display a title of each media type, a percentage of posts originating from respective media types, a number of posts originating from one or more respective media types, a change in the percentage over a defined period of time (e.g., one day, one week, one month, one year, the like, etc.), the like, or a combination thereof.

The media types can be displayed in order by a media type having the highest percentage to a media type having the lowest percentage. Conversely, the media types can be displayed in order by the media type having the lowest percentage to the media type having the highest percentage.

In the example depicted in FIG. 3, the fourth display portion 308 depicts that the 96.2% of the posts in the cache of social media post data which originated from the United States and has positive sentiment is posted on Twitter®, that 153 of the posts in the cache of social media post which originated from the United States and has positive sentiment is posted on Twitter®, and that the percentage of posts in the cache of social media post data which originated from the United States, has positive sentiment, and is posted on Twitter® has decreased 10% in the past day.

In some implementations, the fourth display portion 308 may display a percent change in the card. For example, twice as many posts may be stored within the cache so that a comparison between a current count and a previous count for a period may be provided. That is, in order to determine the decrease in 10% of the positive sentiments posted on Twitter in the past day, the previous day's positive sentiments may be stored in the cache, along with the current day's positive sentiments.

A fifth display portion 310 depicts a breakdown of the respective language of social media posts represented by the data in the cache of social media post data, where the country of origin of the posts is the United States, where the sentiment is positive, where the posts are posted on Twitter®.

In an example, the language can be at least one language, such as English, Traditional Chinese, Simplified Chinese, a combination of Traditional Chinese and Simplified Chinese, Japanese, Korean, Dutch, French, German, Italian, Portuguese, Spanish, emoticons, the like, or a combination thereof. The language can be written, spoken or both.

The fifth display portion 310 can display a title of each language, a percentage of posts in a respective language, a number of posts in a respective language, a change in the percentage over a defined period of time (e.g., one day, one week, one month, one year, the like, etc.), the like, or a combination thereof.

The languages can be displayed in order by a respective language having the highest percentage to a language having the lowest percentage. Conversely, the languages can be displayed in order by the language having the lowest percentage to the language having the highest percentage.

In the example depicted in FIG. 3, the fifth display portion 310 depicts that the 96.7% of the posts in the cache of social media post data which originated from the United States, have positive sentiment, and are posted on Twitter® are in English, that 148 of the posts in the cache of social media post data which originated from the United States, have positive sentiment, and are posted on Twitter® are in English, and that the percentage of the posts in the cache of social media post data which originated from the United States, have positive sentiment, and are posted on Twitter® are in English has decreased 5% in the past day.

In an example, clicking on a display element in the display image 300, hovering a cursor over on a display element in the display image 300, the like, or a combination thereof can trigger display of one or more social media posts conforming to the restrictions of the respective display element. This permits inspecting individual social media posts which provided the results in a respective specific analysis. In an example, clicking on "Spanish" in the fifth display portion 310 triggers display of one or more social media posts which are in the cache of social media post data, which originated from the United States, which have positive sentiment, which are posted on Twitter®, and which are written in Spanish. This enables a user to accurately read at least a sample of the social media posts meeting the restrictions of the display element. Triggering the display of the individual social media posts can initiate querying the index for respective post identification numbers and using the respective post identification numbers to retrieve the individual social media posts from the main database of social media post data. Enabling inspecting posts in this manner reduces API calls to the main database and reduces workflow.

In an example, the refresh button can be located in any practicable location on the display image 300. In another example, clicking on the refresh button in the display image 300, hovering a cursor over on a display element in the display image 300, the like, or a combination thereof can initiate performing a refresh of the cache of social media post data. For example, the initiating the performing the refresh of the cache of social media post data can include initiating performing at least a portion of the blocks 130 to 140.

The display image 300 can include any practicable number of display portions. The number of display portions depicted in FIG. 3 is illustrative, and not limiting. The display image 300 can include any practicable order of portions. The order of display portions depicted in FIG. 3 is illustrative, and not limiting. The display image 300 can include any practicable type of display portions. The type of display portions depicted in FIG. 3 is illustrative, and not limiting.

Examples of the presently disclosed subject matter can be implemented in and used with a variety of component and network architectures, and are not necessarily limited to a multi-tenant system. FIG. 4 is an example of the computer 400. The computer 400 is suitable for implementations of the presently disclosed subject matter. At least one element of the computer 400 can be configured to perform at least a portion of a method described herein. In an example, at least one element of the computer 400 can be configured to initiate at least a portion of a method described herein. The example of the computer as shown in FIG. 4 can be a client device, a remote platform, a server, the like, or a combination thereof, on which at least a portion of the disclosed methods can be performed.

As shown in FIG. 4, the computer 400 includes a bus 402 which couples major components of the computer 400, such as the processor 404, the memory 406 (typically RAM, but which can also include ROM, flash RAM, or the like), an input/output (I/O) controller 408, the display 410, such as a display screen via a display adapter, the user input interface device 412, which can include one or more controllers and associated user input devices such as a keyboard, mouse, and the like, and can be coupled to the I/O controller 408, the fixed storage 414, such as a hard drive, flash storage, fiber channel network, SAN device, SCSI device, and the like, and the removable storage medium 416 operative to control and receive an optical disk, flash drive, the like, or a combination thereof.

The bus 402 enables data communication between the processor 404 and the memory 406, which can include read-only memory (ROM) or flash memory (neither shown), and random access memory (RAM) (not shown), as previously noted. The RAM is generally the main memory into which the operating system and application programs are loaded. The ROM or flash memory can store, among other code, the Basic Input-Output system (BIOS) which controls basic hardware operation such as the interaction with peripheral components. Applications resident with the computer 400 can be stored on, and accessed via, a computer readable medium, such as a hard disk drive (e.g., the fixed storage 414), a solid-state drive, an optical drive, floppy disk, or other storage medium.

The fixed storage 414 can be integral with the computer 400 or can be separate and accessed through other interfaces. A network interface 418 can provide a direct coupling to a remote server via a wired telephone link, a wireless telephone link, a cable link, an optical fiber link, a satellite link, the like, or a combination thereof, to the Internet via an Internet service provider (ISP), a direct coupling to a remote server via a direct network link to the Internet via a point of presence (POP), the like, or another technique. The network interface 418 can provide such coupling using wireless techniques, including a digital cellular telephone coupling, a Cellular Digital Packet Data (CDPD) coupling, a digital satellite data coupling, the like, or a combination thereof. For example, the network interface 418 can enable the computer to communicate with other computers via one or more local, wide-area, or other networks, as shown in FIG. 5. Many other devices or components (not shown) can be coupled in a similar manner. Conversely, not all of the components shown in FIG. 4 need be present to practice the present disclosure. The components can be coupled in different ways from that shown. Code (i.e., instructions configured to cause a processor to perform an action) configured to implement at least a portion of the present disclosure (e.g., configured to initiate at least a portion of a method described herein) can be stored in a non-transient computer-readable storage media such as one or more of the memory 406, the fixed storage 414, the removable storage medium 416, a remote storage location, the like or a combination thereof.

FIG. 5 shows an example network 500 according to an example of the disclosed subject matter. At least one element of the example network 500 can be configured to perform at least a portion of a method described herein. At least one element of the example network 500 can be configured to initiate at least a portion of a method described herein. The first client 502 and the second client 504 (such as one or more local computers, one or more smart phones, one or more tablet computing devices, the like, or a combination thereof) can be coupled to other devices via the one or more networks 506. The network 500 can be a local network, a wide-area network, the Internet, or any other suitable communication network or networks. The network 500 can be implemented on any suitable platform including a wired network, a wireless network, or both. The first client 502 and the second client 504 can communicate with the one or more servers 508, the database 510, or both. The devices coupled to the one or more networks 506 can be directly accessible by the first client 502, the second client 504, the like, or a combination thereof. One or more other devices can provide intermediary access to the first client 502, the second client 504, the like, or a combination thereof, such as where the one or more servers 508 provide access to resources stored in the database 510. The first client 502, the second client 504, the like, or a combination thereof also can access the remote platform 512 or services provided by the remote platform 512, such as cloud computing arrangements, services, the like, or a combination thereof. The remote platform 512 can include the one or more servers 508, the database 510, or both. At least a part of a method described herein can be performed by one or more of the servers, databases, remote platforms, or client devices in various examples within the scope of the disclosed subject matter. At least a part of a method described herein can be initiated by one or more of the servers, databases, remote platforms, or client devices in various examples within the scope of the disclosed subject matter.

The provided systems and methods can be implemented as a multi-tenant system. A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants. In some implementations, although the systems and methods may be implemented as a multi-tenant system, the cache may be created separately for each user of the multi-tenant system.

The system can include a server that is configured to generate one or more virtual applications based on data stored in a common database shared between the tenants. Each virtual application can provide access to data in the database for each of the one or more tenants utilizing the system. A tenant can, for example, request social media posts, metadata, analytics provider data, the like, or a combination thereof. Although multiple tenants can share access to a common server and database, the particular data and services provided from the system to each tenant can be securely isolated from those provided to other tenants. The multi-tenant architecture therefore allows different sets of users to share functionality without necessarily sharing their private data. Similarly, the appearance of the interface of each tenant with the system can be unique.

Examples of the presently disclosed subject matter can include or be implemented in the form of computer-implemented processes and apparatuses for practicing those processes. Examples also can be implemented in the form of a computer program product having computer program code including instructions stored on non-transitory tangible media, such as floppy diskettes, CD-ROMs, hard drives, USB (universal serial bus) drives, or any other machine readable storage medium. When the computer program code is loaded into, and executed by, a computer, the computer becomes an apparatus for practicing examples of the disclosed subject matter. Examples also can be implemented in the form of computer program code. When the computer code is loaded into a computer, the computer becomes an apparatus for practicing examples of the disclosed subject matter. When implemented on a general-purpose microprocessor, the computer program code configures the microprocessor to create specific logic circuits. In some configurations, a set of computer-readable instructions stored on a computer-readable storage medium can be implemented by a general-purpose processor, which can transform the general-purpose processor or a device including the general-purpose processor into a special-purpose device configured to implement or carry out the instructions. Examples can be implemented using hardware that can include a processor, such as a general purpose microprocessor and/or an Application Specific Integrated Circuit (ASIC) configured to implement all or part of the provided technical solutions according to examples of the disclosed subject matter in hardware, firmware, or both. The processor can be coupled to memory, such as RAM, ROM, flash memory, a hard disk, a solid-state drive, or any other device capable of storing electronic information. The memory can store instructions configured to be executed by the processor to perform the provided technical solutions according to examples of the disclosed subject matter.

Within this description, the singular can portend the plural, where practicable. This description, for purpose of explanation, refers to specific examples. However, this illustrative description is not intended to be exhaustive or to limit examples of the disclosed subject matter to the precise forms disclosed. Many modifications and variations are possible in view of this disclosure. This description explains principles of examples of the disclosed subject matter and practical applications of the principles, to thereby enable a person skilled in the relevant art to utilize those examples, as well as various examples with various modifications as can be suited to the particular use contemplated.

We claim:

1. A method for preparing a cache of social media post data, the method comprising:
   receiving initial query terms;
   searching, using the initial query terms, a database of social media posts for matching posts and respective metadata for each of the matching posts, wherein the searching is performed using a processing device;
   gathering respective index item data describing one or more respective attributes of each matching post, the index item data being at least one from the group consisting of: a media type, a media provider, a language in which the respective matching post is written, a region of origin of the respective matching post, a sentiment of the respective matching post, an author of the respective matching post, and a date the respective matching post was published;
   combining, for each of the matching posts, the respective index item data with the respective metadata to form combined data;
   storing, in a cache, the matching posts and the combined data for each matching post to provide the cache of social media post data;
   preparing a cache index by indexing the cache;
   analyzing the social media post data stored in the cache based on at least a media type and a sentiment; and
   displaying results from analyzing the social media post data.

2. The method of claim 1, wherein the respective metadata identifies a sentiment of a respective post, identifies a keyword group used to discover a respective post, or both.

3. The method of claim 1, further comprising:
   receiving one or more additional query terms;
   searching, using the additional query terms, the cache index for matching index item data, matching respective metadata, or both; and
   displaying, on a display device, results of the search.

4. The method of claim 3, wherein one or more of the additional query terms is not an attribute in the index item data or the respective metadata, and further comprising:

searching, using the one or more additional query terms which are not an attribute in the index item data or the respective metadata, the database of social media posts for one or more additional matching posts and respective additional metadata for each additional matching post;

gathering additional index item data describing one or more respective attributes of each additional matching post;

combining, to form revised combined data, the combined data, the respective additional index item data, and the additional respective metadata;

storing, in the cache, the revised combined data; and reindexing the cache.

5. The method of claim 4, wherein at least one of the one or more additional query terms which is not an attribute in the index item data or the respective metadata is:
a keyword;
a post tag;
an author tag; or
a combination thereof.

6. The method of claim 1, further comprising:
receiving a refresh request;
performing a subsequent search, in response to the refresh request and using the initial query terms, of the database of social media posts for subsequent matching posts and subsequent respective metadata for each subsequent matching post;
gathering subsequent index item data describing one or more respective attributes of each subsequent matching post;
combining, for each of the subsequent matching posts, the subsequent respective index item data with the subsequent respective metadata for each subsequent matching post to form subsequent combined data;
storing, in a second cache, the subsequent matching posts and the subsequent combined data for each subsequent matching post; and
indexing the second cache.

7. The method of claim 1, further comprising at least one of:
deleting at least a portion of the matching posts stored in the cache, at least a portion of the combined data stored in the cache, or both; or
a sequence of:
receiving subsequent query terms;
searching subsequently, using the subsequent query terms, the cache index for matching respective index item data, matching respective metadata, or both; and
displaying, on a display device, results of the subsequent search.

8. A system for preparing a cache of social media post data, the system comprising:
a processor; and
a memory coupled to the processor and storing instructions configured to cause the processor to:
initiate receiving initial query terms;
initiate searching, using the initial query terms, a database of social media posts for matching posts and respective metadata for each of the matching posts, wherein the searching is performed using a processing device;
initiate gathering respective index item data describing one or more respective attributes of each matching post, the index item data being at least one from the group consisting of: a media type, a media provider, a language in which the respective matching post is written, a region of origin of the respective matching post, a sentiment of the respective matching post, an author of the respective matching post, and a date the respective matching post was published;
initiate combining, for each of the matching posts, the respective index item data with the respective metadata to form combined data;
initiate storing, in a cache, the matching posts and the combined data for each matching post to provide the cache of social media post data;
initiate preparing a cache index by indexing the cache;
analyze the social media post data stored in the cache based on at least a media type and a sentiment; and
display results from analyzing the social media post data.

9. The system of claim 8, wherein the respective metadata identifies a sentiment of a respective post, identifies a keyword group used to discover a respective post, or both.

10. The system of claim 8, wherein the instructions further comprise instructions configured to cause the processor to:
initiate receiving one or more additional query terms;
initiate searching, using the additional query terms, the cache index for matching index item data, matching respective metadata, or both; and
initiate displaying, on a display device, results of the search.

11. The system of claim 10, wherein one or more of the additional query terms is not an attribute in the index item data or the respective metadata, and the instructions further comprise instructions configured to cause the processor to:
initiate searching, using the one or more additional query terms which are not an attribute in the index item data or the respective metadata, the database of social media posts for one or more additional matching posts and respective additional metadata for each additional matching post;
initiate gathering additional index item data describing one or more respective attributes of each additional matching post;
initiate combining, to form revised combined data, the combined data, the respective additional index item data, and the additional respective metadata;
initiate storing, in the cache, the revised combined data; and
initiate reindexing the cache.

12. The system of claim 11, wherein at least one of the one or more additional query terms which is not an attribute in the index item data or the respective metadata is:
a keyword;
a post tag;
an author tag; or
a combination thereof.

13. The system of claim 8, wherein the instructions further comprise instructions configured to cause the processor to:
initiate receiving a refresh request;
initiate performing a subsequent search, in response to the refresh request and using the initial query terms, of the database of social media posts for subsequent matching posts and subsequent respective metadata for each subsequent matching post;
initiate gathering subsequent index item data describing one or more respective attributes of each subsequent matching post;
initiate combining, for each of the subsequent matching posts, the subsequent respective index item data with the subsequent respective metadata for each subsequent matching post to form subsequent combined data;

initiate storing, in a second cache, the subsequent matching posts and the subsequent combined data for each subsequent matching post; and initiate indexing the second cache.

14. The system of claim 8, wherein the instructions further comprise instructions configured to cause the processor to at least one of:

initiate deleting at least a portion of the matching posts stored in the cache, at least a portion of the combined data stored in the cache, or both; or a sequence of:
   initiate receiving subsequent query terms;
   initiate searching subsequently, using the subsequent query terms, the cache index for matching respective index item data, matching respective metadata, or both; and
   initiate displaying, on a display device, results of the subsequent search.

15. A non-transitory computer-readable storage medium comprising instructions stored thereon which are configured to cause a processor in a host organization to perform operations, wherein the operations include:

initiating receiving initial query terms;

initiating searching, using the initial query terms, a database of social media posts for matching posts and respective metadata for each of the matching posts, wherein the searching is performed using a processing device;

initiating gathering respective index item data describing one or more respective attributes of each matching post, the index item data being at least one from the group consisting of: a media type, a media provider, a language in which the respective matching post is written, a region of origin of the respective matching post, a sentiment of the respective matching post, an author of the respective matching post, and a date the respective matching post was published;

initiating combining, for each of the matching posts, the respective index item data with the respective metadata to form combined data;

initiating storing, in a cache, the matching posts and the combined data for each matching post to provide the cache of social media post data;

initiating preparing a cache index by indexing the cache;

analyzing the social media post data stored in the cache based on at least a media type and a sentiment; and displaying results from analyzing the social media post data.

16. The non-transitory computer readable storage medium of claim 15, wherein the respective metadata identifies a sentiment of a respective post, identifies a keyword group used to discover a respective post, or both.

17. The non-transitory computer readable storage medium of claim 15, wherein the operations further include:

initiating receiving one or more additional query terms;

initiating searching, using the additional query terms, the cache index for matching index item data, matching respective metadata, or both; and initiating displaying, on a display device, results of the search.

18. The non-transitory computer readable storage medium of claim 17, wherein one or more of the additional query terms is not an attribute in the index item data or the respective metadata, and the operations further include:

initiating searching, using the one or more additional query terms which are not an attribute in the index item data or the respective metadata, the database of social media posts for one or more additional matching posts and respective additional metadata for each additional matching post;

initiating gathering additional index item data describing one or more respective attributes of each additional matching post;

initiating combining, to form revised combined data, the combined data, the respective additional index item data, and the additional respective metadata;

initiating storing, in the cache, the revised combined data; and initiating reindexing the cache.

19. The non-transitory computer readable storage medium of claim 18, wherein at least one of the one or more additional query terms which is not an attribute in the index item data or the respective metadata is:

a keyword;
a post tag;
an author tag; or
a combination thereof.

20. The non-transitory computer readable storage medium of claim 15, wherein the operations further include:

initiating receiving a refresh request;

initiating performing a subsequent search, in response to the refresh request and using the initial query terms, of the database of social media posts for subsequent matching posts and subsequent respective metadata for each subsequent matching post;

initiating gathering subsequent index item data describing one or more respective attributes of each subsequent matching post;

initiating combining, for each of the subsequent matching posts, the subsequent respective index item data with the subsequent respective metadata for each subsequent matching post to form subsequent combined data;

initiating storing, in a second cache, the subsequent matching posts and the subsequent combined data for each subsequent matching post; and initiating indexing the second cache.

21. The non-transitory computer readable storage medium of claim 15, wherein the operations further include at least one of:

initiating deleting at least a portion of the matching posts stored in the cache, at least a portion of the combined data stored in the cache, or both; or a sequence of:
   initiating receiving subsequent query terms;
   initiating searching subsequently, using the subsequent query terms, the cache index for matching respective index item data, matching respective metadata, or both; and
   initiating displaying, on a display device, results of the subsequent search.

* * * * *